US012693241B2

(12) United States Patent
Ding et al.

(10) Patent No.: US 12,693,241 B2
(45) Date of Patent: Jul. 28, 2026

(54) SURFACE INSPECTION SYSTEM

(71) Applicant: Onto Innovation Inc., Wilmington, MA (US)

(72) Inventors: Jian Ding, Methuen, MA (US); Ju Jin, Edina, MN (US)

(73) Assignee: Onto Innovation Inc., Wilmington, MA (US)

( * ) Notice: Subject to any disclaimer, the term of this patent is extended or adjusted under 35 U.S.C. 154(b) by 110 days.

(21) Appl. No.: 18/603,575

(22) Filed: Mar. 13, 2024

(65) Prior Publication Data

US 2025/0290871 A1     Sep. 18, 2025

(51) Int. Cl.
| | |
|---|---|
| *G01N 21/88* | (2006.01) |
| *G01N 21/95* | (2006.01) |
| *G01N 21/956* | (2006.01) |

(52) U.S. Cl.
CPC ... *G01N 21/95684* (2013.01); *G01N 21/8851* (2013.01); *G01N 21/9501* (2013.01); *G01N 2201/1087* (2013.01)

(58) Field of Classification Search
CPC ......... G01N 21/95684; G01N 21/8851; G01N 21/9501; G01N 2201/1087
See application file for complete search history.

(56) References Cited

U.S. PATENT DOCUMENTS

| | | | |
|---|---|---|---|
| 4,583,857 A | 4/1986 | Grammerstorff et al. | |
| 5,986,763 A | 11/1999 | Inoue | |
| 2002/0018591 A1 | 2/2002 | Murayama et al. | |
| 2002/0140949 A1* | 10/2002 | Sasaki | G01N 21/95684 |
| | | | 356/606 |
| 2010/0177951 A1 | 7/2010 | Vodanovic | |
| 2015/0055141 A1 | 2/2015 | Cai et al. | |
| 2021/0285893 A1 | 9/2021 | Okuzono et al. | |

FOREIGN PATENT DOCUMENTS

| | | | | |
|---|---|---|---|---|
| JP | 2000121323 | | 4/2000 | |
| JP | 2002237498 A | | 8/2002 | |
| JP | 2006090918 A | | 4/2006 | |
| JP | 2007248410 A | | 9/2007 | |
| JP | 2026085045 A | * | 5/2016 | G01B 11/02 |
| KR | 101233993 | | 2/2013 | |
| KR | 10-1273094 B1 | | 6/2013 | |
| TW | 201323822 | | 6/2013 | |
| TW | 201903926 | | 1/2019 | |

OTHER PUBLICATIONS

"International Application Serial No. PCT US2025 016565, International Search Report mailed May 30, 2025", 3 pgs.
"Taiwanese Application Serial No. 114106970, Office Action mailed Sep. 18, 2025", with manual English translation, 20 pages.
"Taiwanese Application Serial No. 114106970, Response filed Mar. 18, 2026 to Office Action mailed Sep. 18, 2025", with English claims, 62 pages.

* cited by examiner

*Primary Examiner* — Jamil Ahmed

(74) *Attorney, Agent, or Firm* — Schwegman Lundberg & Woessner, P.A.

(57)     ABSTRACT

A surface inspection system can be provided with a laser spot size or a laser line width that is selectable based on a measurable aspect of the objects under test that project upward or downward from a surface under test. The larger laser spot size or line width can be selected to cover a larger area of the surface under test at a time, which can increase scanning speed over the surface under test and enhance system measurement throughput.

20 Claims, 10 Drawing Sheets

300

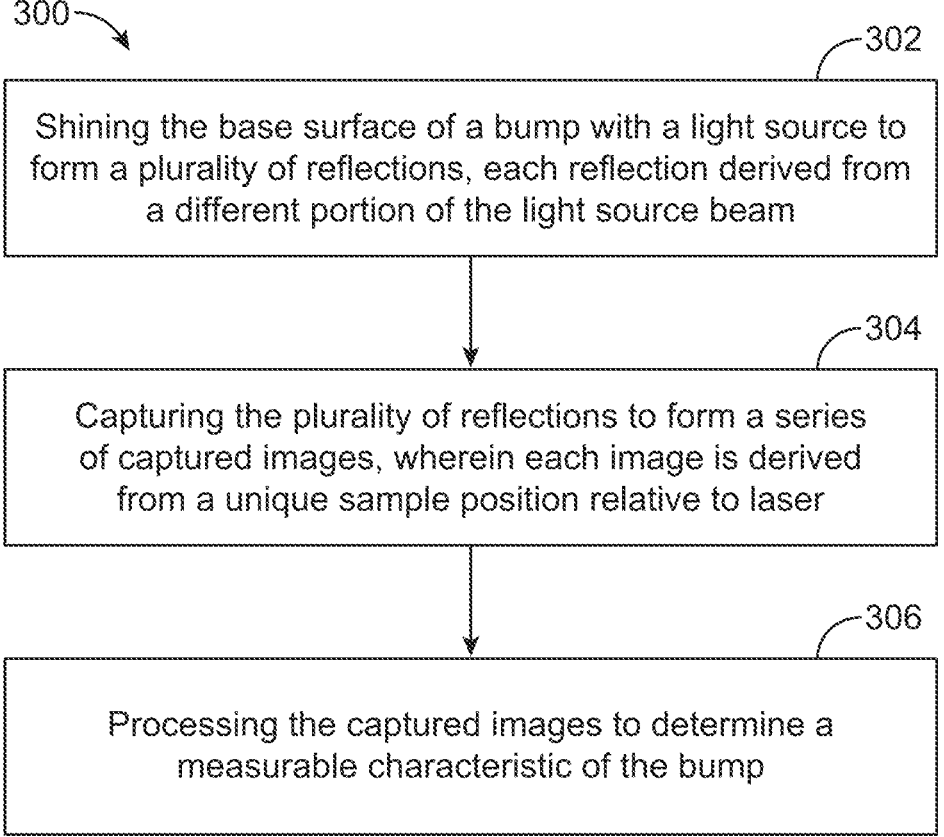

302

Shining the base surface of a bump with a light source to form a plurality of reflections, each reflection derived from a different portion of the light source beam

304

Capturing the plurality of reflections to form a series of captured images, wherein each image is derived from a unique sample position relative to laser

306

Processing the captured images to determine a measurable characteristic of the bump

FIG. 3

Bump Height: 30 um, Diameter 50 um,
Bump Top Radius of Curvature 50 um

Bump Height: 30 um, Diameter 50 um,
Bump Top Radius of Curvature 50 um

SURFACE INSPECTION SYSTEM

TECHNOLOGY FIELD

The disclosed subject matter is related generally to the field of substrate equipment used in manufacturing and fabrication facilities. More specifically, in various embodiments, the disclosed subject matter is related to image-processing of image data used for characterization of features on substrates.

BACKGROUND

Conventional surface inspection systems, often referred to as profile sensors, use a laser triangulation principle for three-dimensional profile detection on surfaces under test (SUT) such as, for example, a surface of a workpiece processable to form a semiconductor device. In some examples, an inspection system includes multiple laser line projection units, each including one or multiple lasers, which may be of a different color. The inspection system further includes an optical train configured to form substantially one laser line. The laser line is projected onto a surface under test on a substrate, which includes a surface feature that extends upward or downward in a direction normal to a plane of the surface under test. For example, a surface feature can extend to a height h above a plane of the surface under test. The surface under test and the surface feature move along a direction in a plane of the surface under test such that the surface feature is translated with respect to the laser line projection unit.

Diffuse or specular reflections from surface feature are directed onto a sensor matrix in a camera. From the images on the sensor matrix, a controller calculates distance information such as, for example the height of the surface feature, and the position of the laser line.

Some laser triangulation systems can include a surface moving along the x direction. An object under test can extend to a height h along the z-direction above the surface. The object can include a top surface and side surfaces substantially normal to a plane of the top surface. A laser line projector typically projects a laser line in the y-direction onto the moving surface, and reflections from the laser line are collected in a camera.

The camera can include a detector with an arrangement of pixels. When the object passes through the laser line, an image of the top surface is formed on the detector. The image is displaced a distance d with respect to the images of the moving surface. The distance d of the pixel shift between the image of the top of object and the images of the moving surface represents the z-axis change detected by the detector, and corresponds to the height h of the top surface above the moving surface. These types of laser triangulation systems suffer from serious drawbacks, such as slowing down measurement procedures.

SUMMARY

As described above, traditional triangulation assumes that the entire interrogating optical beam comes from the same location of the sample examined. The transitional time periods as the laser line moves up and down the side surfaces of the object are ignored, and do not produce an analyzable image on the detector. These assumptions and approximations are good when, for example, the width of interrogating laser line is relatively small with respect to the size of object under test. However, as the features investigated by the laser line become increasingly small, the width of the interrogating laser beam can be substantially similar to, or larger than, the size of the object under test, it becomes hard to avoid the situation when part of the laser line is on the object under test and part of it is off the object under test.

In surface inspection systems utilizing laser triangulation, as surface features to be measured become ever smaller, the laser spot size or laser line width can be minimized to improve spatial resolution. However, the reduced size of the interrogating laser line also slows down the measurement procedure. Smaller spot sizes or narrower line widths also increase the number of points to be analyzed by the controller interfaced with the sensor matrix on the camera, which slows the measurement speed of the surface inspection system.

In one aspect, the present disclosure is directed to a surface inspection system with a laser spot size or a laser line width that is selectable based on a measurable aspect of the objects under test that project upward or downward from a surface under test. In some examples, the surface inspection system can include multiple lasers, each having the same or different linewidths. The larger laser spot size or line width can be selected to cover a larger area of the surface under test at a time, which can increase scanning speed over the surface under test and enhance system measurement throughput.

In the surface inspection systems of the present disclosure, a sensor matrix is aligned to collect light reflected from a surface feature to be analyzed. As the surface under test is translated with respect to the sensor matrix, the surface features to be analyzed move through an interrogating laser beam. A different portion of the interrogating beam reflects from each unique part of the surface feature and forms a series of reflections. The reflections create corresponding image data on the sensor matrix and forms a captured image. The object will move to the next position when another captured image derived from a different portion of the interrogating beam is captured.

These complex images received by the detector are then analyzed by one or more processors to determine a measurable characteristic of the surface feature such as, for example, height above the surface. The complex images obtained from the different portions of a surface feature can be difficult to analyze, which can reduce the accuracy of traditional centroid calculations utilized in laser triangulation techniques.

In the system and method of the present disclosure, the multiple captured images, derived from all portions of the interrogating beam and each originating from a unique portion of the surface feature, are analyzed by a processor, which may be integral with or remote from the sensor matrix. In one example, to determine a height of the surface feature extending above a plane of the surface under test, a first captured image is derived from a reflection including an onset of a shadow of a leading edge of a surface feature, and a second captured image is derived from a reflection including a disappearance of shadow of a trailing edge of the surface feature. The one or more processors are configured to determine a height of the surface feature with respect to a plane of the surface based on the first captured image and the second captured image.

Described herein is an apparatus to measure a characteristic of a surface feature on a substrate with improved speed. The apparatus comprises a light source to emit an interrogating beam onto a surface of the substrate comprising at least one surface feature, wherein the interrogating beam is configured to interact with the at least one surface feature to form a plurality of reflections, each reflection being derived from a different portion of the interrogating beam. The apparatus also comprises a sensor to capture the plurality of reflections, wherein the plurality of reflections form a captured image. The apparatus further comprises one or more processors configured to analyze the captured image to determine a measurable characteristic of the at least one surface feature.

Described herein is a method for determining a characteristic of a surface feature on a surface of a substrate faster, the method comprising: shining the surface with at least one light source, wherein the at least one light source emits an interrogating beam that interacts with the surface feature to form a plurality of reflections, wherein each reflection is derived from a different portion of the interrogating beam; capturing the plurality of reflections to generate a plurality of captured images, wherein each captured image is derived from a unique sample position relative to the interrogating beam; and processing at least a portion of the plurality of captured images to determine a measurable characteristic of the surface feature.

BRIEF DESCRIPTION OF THE DRAWINGS

The drawings, which are not necessarily drawn to scale, illustrate generally, by way of example, but not by way of limitation, various embodiments discussed in the present document.

FIG. 3 is a flow chart of a method of surface inspection utilizing a surface inspection system of the present disclosure, according to various embodiments.

Figure 1:
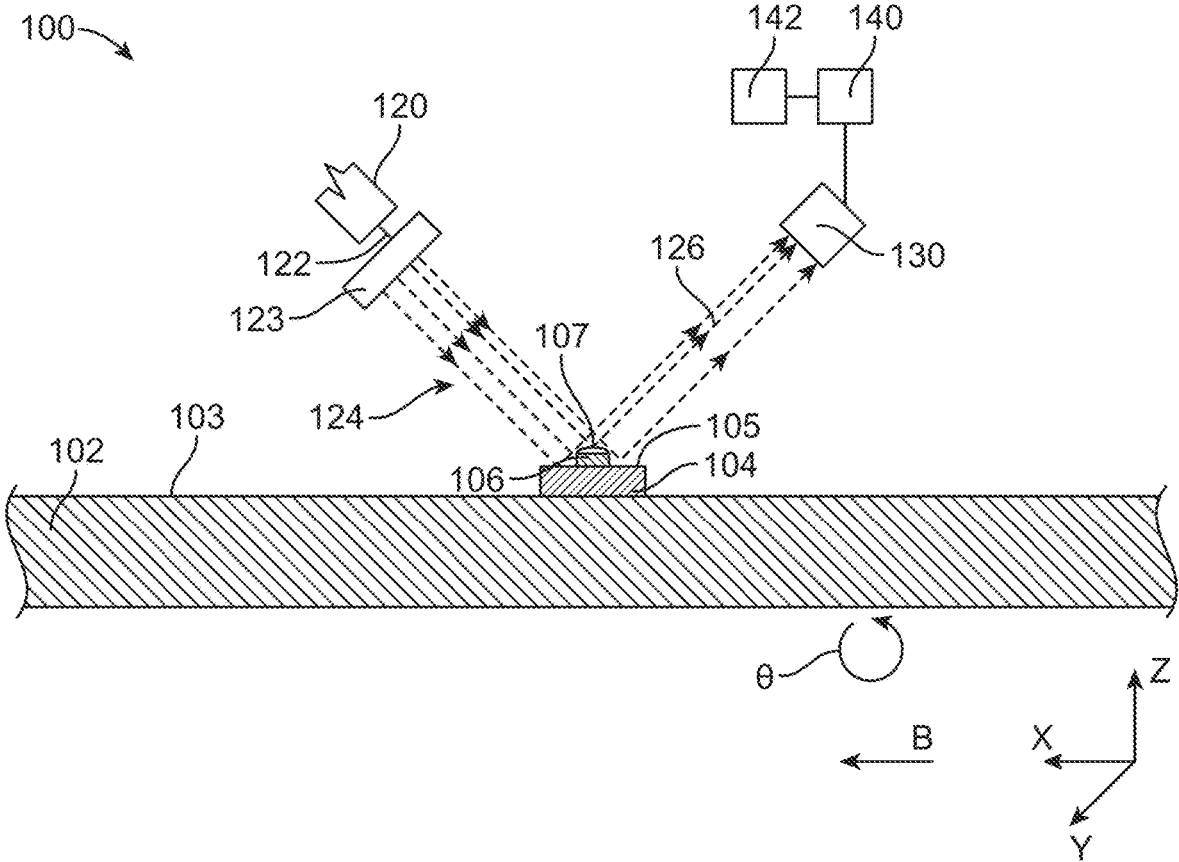
FIG. 1 is cross-sectional view of a surface inspection system of the present disclosure, according to various embodiments.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

Unless otherwise noted, like symbols in the drawings indicate like elements.

DETAILED DESCRIPTION

In conventional surface inspection systems utilizing laser triangulation, the laser spot size or laser line width is minimized to improve spatial resolution. Smaller spot sizes or narrower line widths can increase the number of points to be analyzed by the controller interfaced with the sensor matrix on the camera, which slows the measurement speed of the surface inspection system.

In contrast, the surface inspection techniques of the present disclosure can be configured to utilize a laser spot size or a laser line width that is similar or larger in size to that of a dimension of a measurable aspect of at least one surface feature to be analyzed (for example, a diameter, a height, a circumference, and the like). As a particular surface feature moves through the laser spot or line, the laser spot or line reflects from different portions of the surface feature. The reflection from each individual portion of the surface feature is derived from a different portion of the interrogating beam. The reflections are captured by a sensor such as a camera and form captured images on a sensor matrix therein. A processor in the sensor or remote therefrom utilizes the captured images to determine a measurable characteristic of the surface feature. The larger laser spot size or line width can be configured to cover a larger area of the surface under test at a time, which can increase scanning speed over the surface under test and enhance system measurement throughput relative to surface inspection systems utilizing laser triangulation.

Various types of substrates, such as semiconductor wafers, are typically placed into various types of production tools for processing within a fabrication facility (e.g., such as an integrated circuit manufacturing-facility). A robot is used to place the substrates onto a substrate stage within the tool, to prepare the substrate for processing within a processing chamber. Referring now to FIG. 1, a schematic diagram of a surface inspection system 100, which is not to scale, includes a moveable stage 102 with a carrier surface 103 carrying a substrate 104 processable to form a semiconductor device. The stage 102 can be configured to move the substrate 104 in, for example, an x-direction, a y-direction, a z-direction, and a θ-direction (rotating the substrate 104 within the x-y plane as indicated by the arrow surrounding the stage 102). In the example of FIG. 1, the substrate 104 moves along the x-direction as indicated by the arrow B. In various embodiments, the stage 102 may include any type of substrate-holding mechanism known in the art.

In other cases, the x, y, z, or theta stages may carry the detection or part of the detection apparatus instead of the sample under test.

In some examples, which are not intended to be limiting, the substrate 104 can include a wafer including elemental semiconductors (e.g., silicon or germanium), a wafer including compound semiconductors (e.g., gallium arsenide (GaAs) or gallium nitride (GaN)), or variety of other substrate types known in the art (including conductive, semiconductive, and non-conductive substrates, such as glass).

The substrate 104 includes a surface under test 105. The surface under test 105 includes at least one surface feature 106. The at least one surface feature 106 may project upward along the z-direction from a plane of the surface under test 105 as shown in FIG. 1, or may extend downward along the z-direction to form a recess into the surface under test 105. The at least one surface feature 106 on the substrate 104 of the surface under test 105, which may have the same or different shapes, may have any size and shape. In some examples, which are not intended to be limiting, the at least one surface feature 106 has at least one measurable dimension of at least about 3 microns to about 100 microns. In some examples, the measurable dimension can be about 5 microns to about 50 microns.

In one example, the surface feature 106 of FIG. 1 includes a solder bump having a substantially cylindrical shape with an arcuate, dome-like top 107. In some examples, which are not intended to be limiting, the solder bumps can have a height of about 10 microns to about 100 microns, a diameter of about 5 microns to about 100 microns, and a top radius of curvature of about 30 microns to about 70 microns.

The surface inspection system 100 further includes a light source 120, such as, for example, one or more lasers, which emits an interrogating beam 122. Suitable lasers include, but are not limited to, continuous wave (CW) diode pumped lasers. The interrogating beam 122 formed by the one or multiple lasers is shaped and sized by an optical train 123 to form a laser line 124, which can be a variable width. In this case, the laser line direction is along the y-direction. The width of the laser line 124 may be selected using the lens system in the optical train 123. In some examples, which are not intended to be limiting, the width of the laser line is determined using the expected range of heights of the measurable aspect of the at least one surface feature 106.

As the stage 102 moves along the x-direction in the example of FIG. 1, the surface under test 105 and the surface feature 106 interact with the laser line 124. The reflections 126 from the surface under test 105 and the various portions of the surface feature 106 are received by a detector 130. The detector 130 may include one or more collection lenses (e.g., a single variable focal-length lens or a plurality of single focal-length lenses, not shown in FIG. 2) and an image sensor (e.g., a CCD array, a CMOS based sensor, an active-pixel sensor, or other sensor types).

Each of the reflections 126 is derived from a unique portion of the surface feature 106 and forms a corresponding captured image on the image sensor matrix of the detector 130. Each of the reflections 126, which is derived from a different portion of the laser line 124 and is characteristic of a different portion of the surface feature 106, creates a unique image of that portion of the surface feature on the image sensor of the detector 130.

The detector 130 further includes, or is connected to, one or more processors 140 configured to analyze the reflections 126. The processors 140 may be further connected to a user interface 142, which can include displays, input devices, and the like, or to a suitable network.

For example, the detector 130 may include camera boards having related circuitry to facilitate image extraction. In one example, the detector 130 is a color camera, e.g., a RGB camera. A color camera may be desirable since captured colors can help differentiate the substrate 104 from the carrier surface 103 of the stage 102. Also, machine-learning frameworks may be trained on color images, which would otherwise cause integration challenges for gray-scale images collected from a monochrome camera. However, with a known substrate type using a network trained using gray-scale images, a monochromatic camera may be used.

To further enable rapid detection of multiple surface features and enhance the throughput of the surface inspection system 100, the detector 130 can have a refresh rate suitable for processing multiple images. In some examples, the detector 130 can have a refresh rate of about 20,000 frames per second to about 130,000 frames per second. The term refresh rate refers to how many times the camera can update the image it receives every second. In some other examples, data from a pre-defined area in the detector array may be collected to speed up the refresh rate further. In some examples, multiple cameras can be used to collect images to further improve the speed of the measurement process.

Figure 2A:
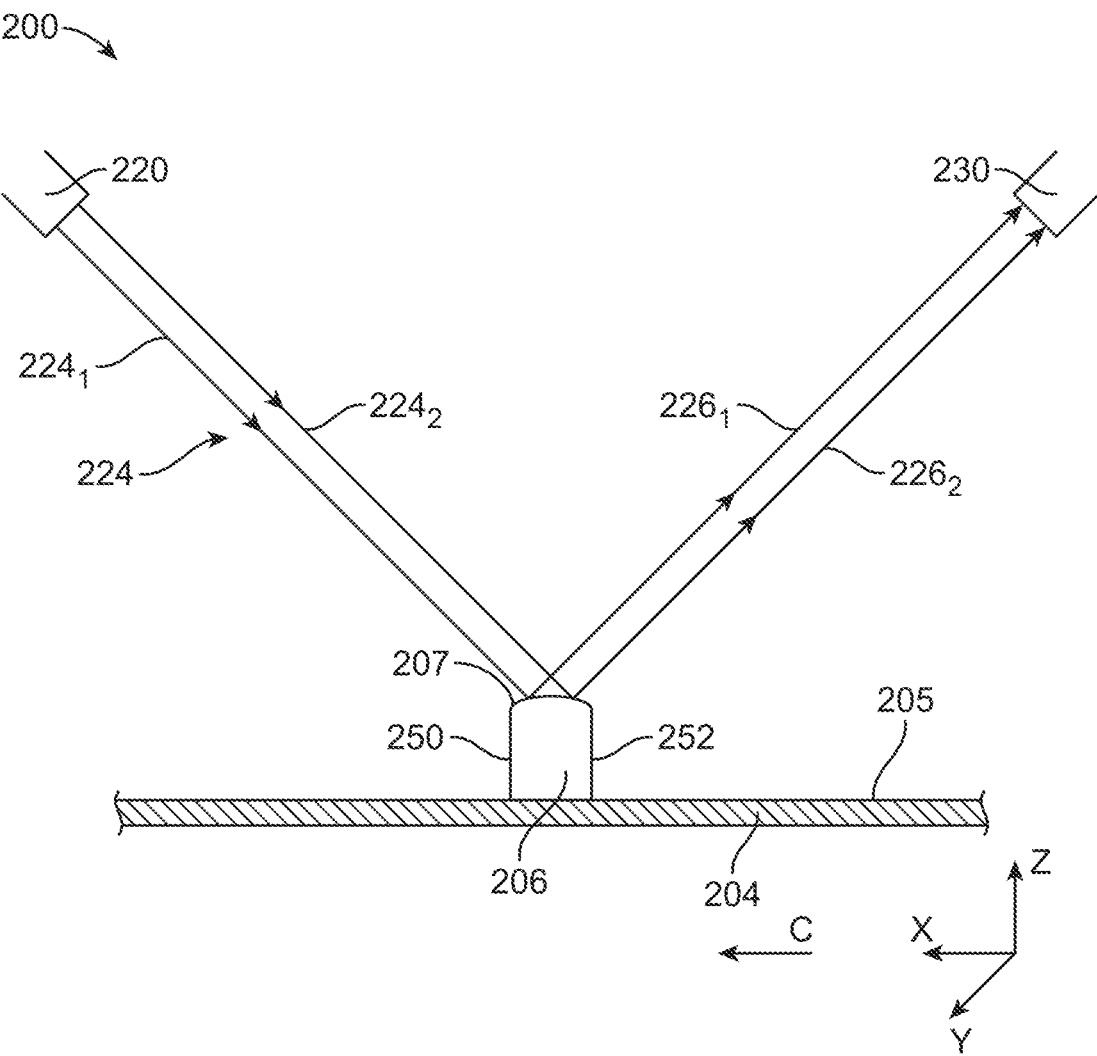
FIG. 2A is a schematic cross-sectional view of an example of the surface inspection system of FIG. 1 used to determine a characteristic of a surface feature, according to various embodiments.

Referring now to FIG. 2A, a surface inspection system 200 includes a portion of a surface under test 205 of a substrate 204 that translates along the x-direction as shown by the arrow C. The surface under test 205 includes a surface feature 206 extending away from the surface under test 205. The surface feature 206 includes a top surface 207, which in some examples can have an arcuate, dome-like shape. The top surface 207 extends between a leading wall 250 and trailing wall 252 of the surface feature 206. The leading wall 250 and the trailing wall 252 are each oriented substantially normal to a plane of the surface under test 205.

As the surface under test 205 advances along the direction of the arrow C, at a particular time, a component ray 2241 of a laser line 224 emitted by one or more lasers 220 reflects from a leading portion of the arcuate top surface 207 of the surface feature 206 and forms a reflection 2261. A component ray 2242 of a laser line 224 reflects from a trailing portion of the arcuate top surface 207 of the surface feature 206 and forms a reflection 2262. The reflections 2261 and 2262 each form its unique images on a pixel array in a camera 230. The resultant final image on camera 230 at this particular time is formed by the superposition of all reflected beam originated from different portion of the laser beaming interacting with a unique portion of the arcuate top surface 207. The surface under test 205 will then move to its next position and another image will be captured. In the method of the present disclosure, one or more processors within or remote from the camera 230 perform a holistic image analysis of the captured images to produce therefrom an aggregate image of a selected measurable characteristic of the arcuate top surface 207. The respective images formed by the unique reflections 2261 and 2262 may be used by the processor to characterize the arcuate shape of the top surface 207 of the surface feature 206. In some examples, CPU, GPU, and/or FPGA techniques can be used to analyze the images.

Figure 2B:
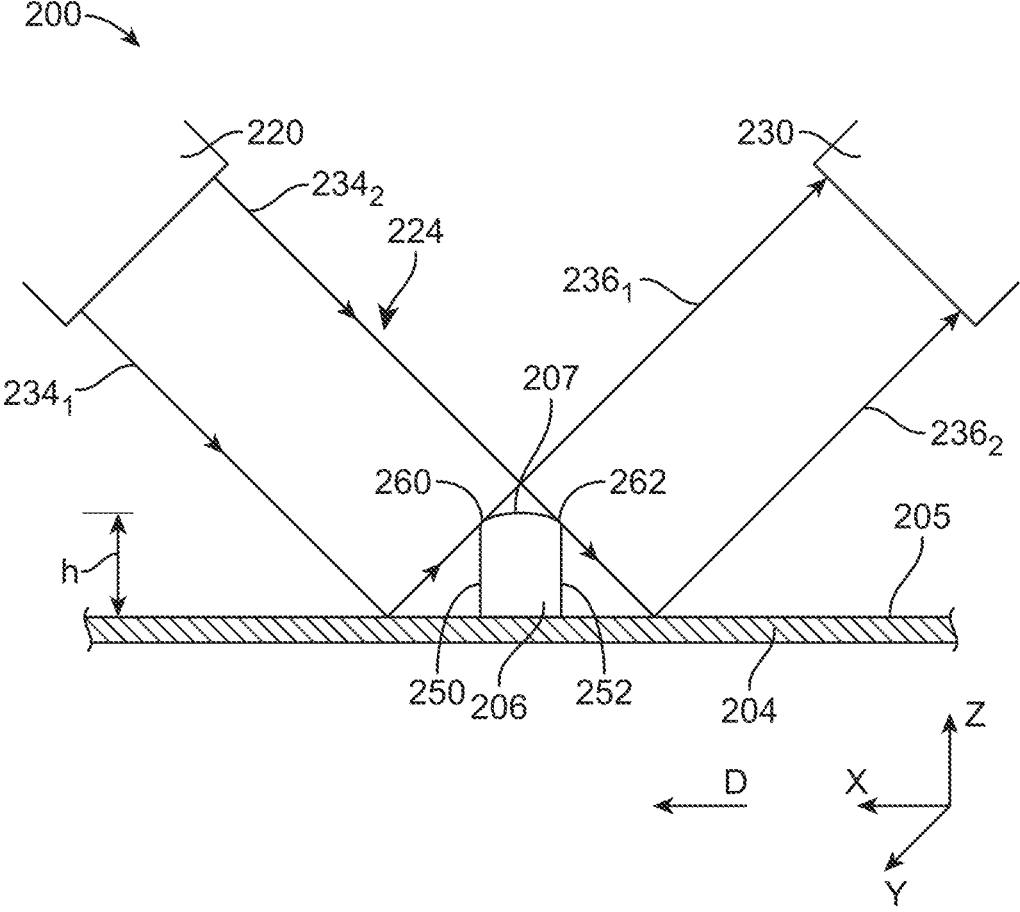
FIG. 2B is a schematic cross-sectional view of an example of the surface inspection system of FIG. 1 as used to determine a characteristic of a surface feature, according to various embodiments.

In another example of the surface inspection system 200 shown in FIG. 2B, the surface under test 205 of a substrate moves through the laser line 224 along the direction of the arrow D. A component ray 2341 of the laser line 224 reflects from the surface under test 205 upstream of the surface feature 206 and just clears a leading edge 260 of the surface feature 206. The resulting reflection 2361 is detected on the pixel array in the camera 230. The captured image formed by the rays immediate to the right of 2341 includes a shadow formed by the leading edge 260 of the surface feature 206.

A component ray 2342 of the laser line 224 just clears a trailing edge 262 of the arcuate top surface 207 of the surface feature 206 and then reflects from the surface under test 205 downstream of the surface feature 206, which forms a reflection 2362. The rays immediate to the left of 2342 (not shown) will interact with the surface feature 206 as described while those to the right will interact with surface under test 205 as described. In general, the laser beam may interact with the arcuate top surface 207 and the surface under test 205 simultaneously so the resulted captured image at camera contains a superposition of all scenarios above.

In an example, the onset of the shadow in the captured image derived from the reflection 2361 and the disappearance of the shadow in the captured image derived from the reflection 2362 may be utilized by the processor to determine a first order height h of the surface feature 206 above the surface under test 205.

After this exposure, the stage moves by projected laser linewidth and repeats the process when the interrogating laser line 224 encounters another surface feature.

The laser line allows the sample to be measured in swath pattern.

Referring now to FIG. 3, the present disclosure is further directed to a method 300 for determining a characteristic of a solder bump extending above a base surface of a substrate.

Step 302 of the method 300 includes shining the base surface of the solder bump with a light source to form a plurality of reflections. Each reflection is derived from a different portion of the interrogating beam of the light source. The plurality of reflections form a captured image.

Step 304 of the method 300 includes capturing with a detector the plurality of reflections to form captured images. Each image is derived from a unique relative position of the sample under investigation to the laser. Steps 302 and 304 are repeated while sample under investigation is moved relative to the laser beam. All the images obtained are sent to step 306 for analysis.

Step 306 of the method 300 includes processing each of the captured images to determine a measurable characteristic of the bump. Suitable measurable characteristics include, but are not limited to, height, diameter, circumference, and combinations thereof.

In some examples, a generalized substrate-characterization system, including at least a portion of a machine-learning network, may be used with or embedded into the system of FIGS. 1, 2A, and 2B. The generalized substrate-characterization system may first be used in a training mode, to train the machine-learning framework, and may then later be used in a normal-operation mode to detect features or characteristics of each substrate. The substrate-characterization system with the trained machine-learning network may then be used at, for example, a fabrication facility (e.g., a semiconductor device manufacturer or "fab") to determine characteristics of each substrate used within the facility.

In some examples, the processor in the detector in the surface inspection system 100 may use, for example, a deep convolutional neural-network in a machine-learning framework. The deep-convolutional neural-network is based on a number of images to characterize the images of the substrate captured by the detector, and the characterized images can then be used to produce an aggregate image of a selected feature or characteristic of the surface. To avoid having to collect millions of raw images, transfer learning may be used. In some examples, the number of images typically used to train the network may be from about 5000 images to about 50,000 images. In some examples, the training can start with a pre-trained network.

Such a training regimen can be used to limit computational requirements that are frequently encountered in more complex deep-convolutional neural network systems. The training may start with a mix of example images, including images of various types of surface features and surfaces of the stage. The images can include multiple images of a given surface feature.

Example

Figure 4A:
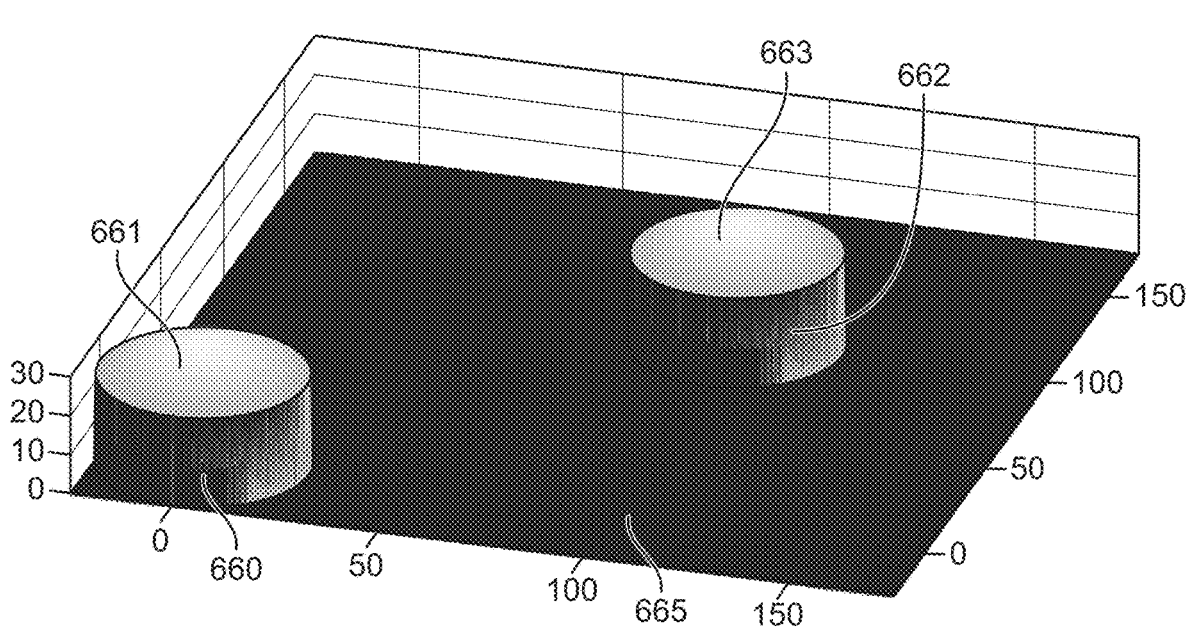
FIG. 4A is a perspective view of solder bumps utilized in the example of the present disclosure.
Figure 4B:
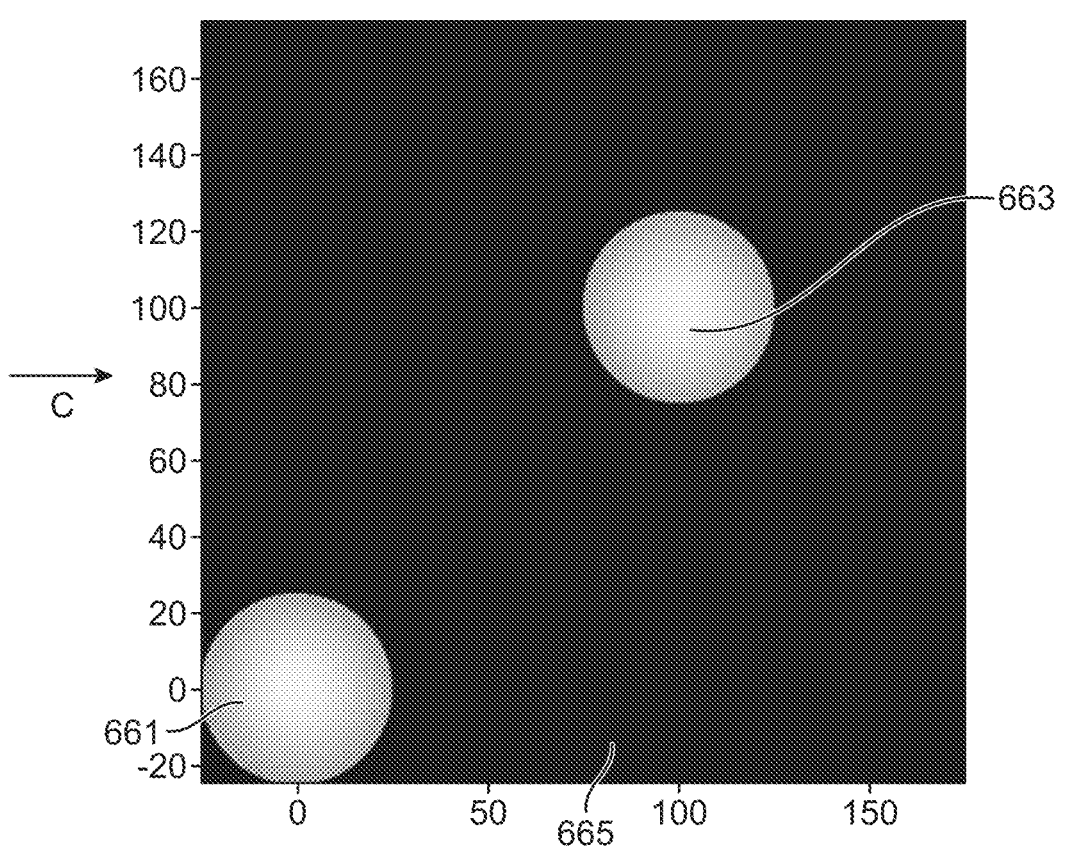
FIG. 4B is an overhead view of the solder bumps of FIG. 4A.
Figure 4C:
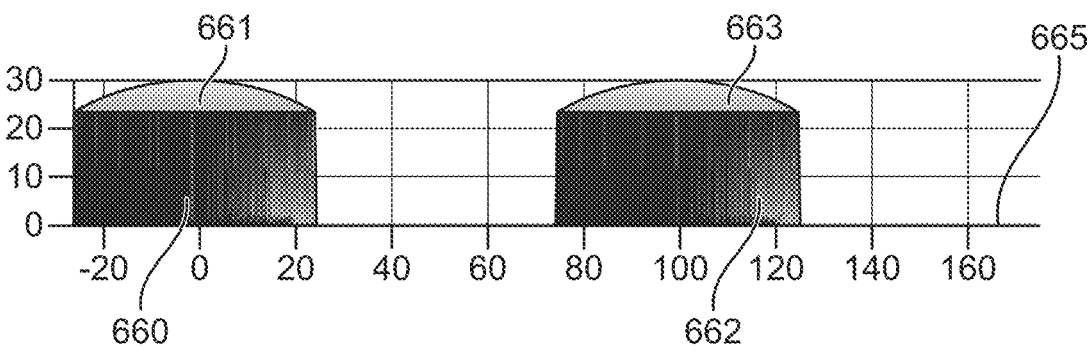
FIG. 4C is a side view of the solder bumps of FIG. 4A.

Referring now to FIG. 4A-4C, two solder bumps 660, 662 are shown centered at locations (0,0) and (100,100), respectively, on a surface under test 665. Each of the solder bumps 660, 662 had a height of 30 microns ($\mu$m) above the surface under test 665, a diameter of 50 microns, and a top surface 661, 663, respectively, having radius of curvature of 50 microns.

A CW diode pumped laser can be used to form a laser line in the vertical direction, and the laser line is moved along the direction of the arrow C (FIG. 4B) over the solder bumps 660, 662. The reflections from the scan are imaged in a camera using a refresh rate of about 50 to about 50000 frames per second, depending on the size of the field of view (FOV). The width of the laser line is varied from about 7 microns (about 14% of the diameter of the solder bumps 660, 662), to about 14 microns (about 28% of the diameter), to about 21 microns (about 42% of the diameter of the solder bumps 660, 662).

Figure 5A:
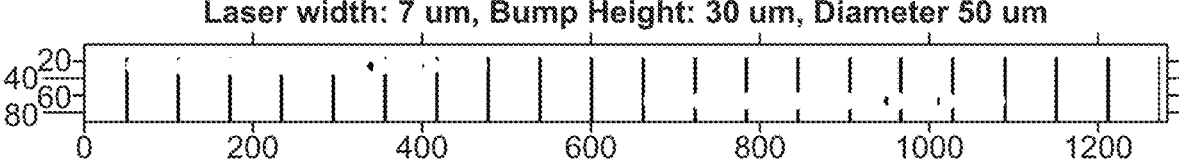
FIGS. 5A-5C are a series of binarized side-by-side images from the solder bumps of FIGS. 4A-4C obtained by the camera in an example surface inspection system of the present disclosure with respective laser line widths of 7 microns, 14 microns and 21 microns and same scanning step size equal to the laser linewidth.
Figure 5B:
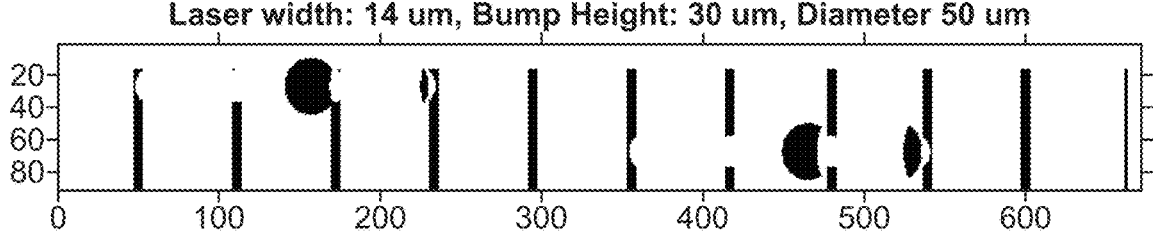
Figure 5C:
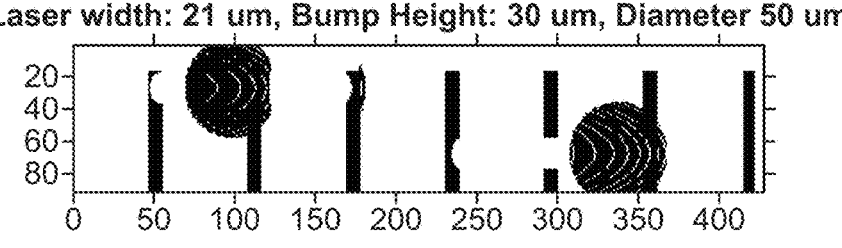

A series of binarized captured images (dimension of 90 pixels by 60 pixels) of the reflections received by the camera during the SUT scan with different step sizes, placed side-by-side, are shown in FIGS. 5A-5C. The image height is the 90 pixels. In this example, each pixel represents 2.5 $\mu$m in real space. The horizonal label is the pixel position of the combined images. In all three cases, the scan step sizes are kept the same as the laser widths. The total scan distance is 150 $\mu$m.

In FIG. 5A, the laser line width is 7 $\mu$m, as well as the scan step size. There are total of 22 images (90×60) collected to scan through the bump area. FIG. 5A show shadows of the solder bump 660 starting to appear at position 0 on the horizontal axis and disappearing beyond position 400. The images in FIG. 5A show shadows of the solder bump 662 appearing past position 600 and disappearing between positions 1000 and 1200. The image of the solder bump 662 is lower than the images of the solder bump 660, indicating differing respective locations of the solder bumps on the surface under test.

For the 14-micron laser line width, the images in FIG. 5B show shadows of the solder bump 660 starting to appear at position 0 on the horizontal axis and disappearing between positions 200 and 300. The series of images show shadows of the solder bump 662 appearing past position 300 and disappearing before position 600. Again, the image of the solder bump 662 is lower than the images of the solder bump 660, indicating the differing respective locations of the solder bumps. There are only 11 images (90×60) collected to cover the entire scan of 150 $\mu$m. For the same camera frame rate, the time to obtain the scan is cut to half compared to the 7 $\mu$m case.

For the 21-micron laser line width, the images in FIG. 5C show shadows of the solder bump 660 starting to appear at position 50 on the horizontal axis and disappearing between positions 100 and 150. In addition, the images show a rounded feature that appears to show a portion of the top surface 661. The images show shadows of the solder bump 662 appearing past position 200 and disappearing before position 400. The images also show a rounded feature that appears to show a portion of the top surface 663. Again, the image of the solder bump 662 is lower than the images of the solder bump 660, indicating the differing respective locations of the solder bumps. There are only 7 images (90×60) collected to cover the entire scan of 150 μm. For the same camera frame rate, the time to obtain the scan is cut to one third compared to the 7 μm case.

Figure 6A:
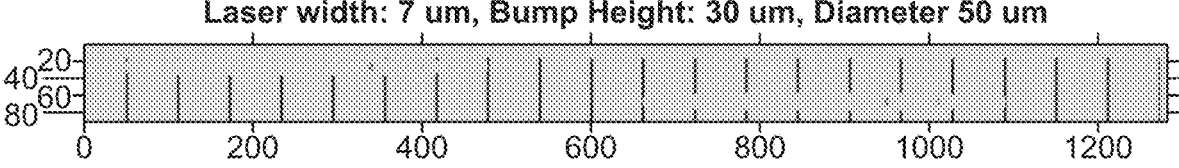
FIGS. 6A-6C are gray scale plots of the images of the reflections from the solder bumps of FIGS. 4A-4C obtained by the camera in an example surface inspection system of the present disclosure using respective laser line widths of 7 microns, 14 microns and 21 microns and same scanning step size equal to the laser linewidth.
Figure 6B:
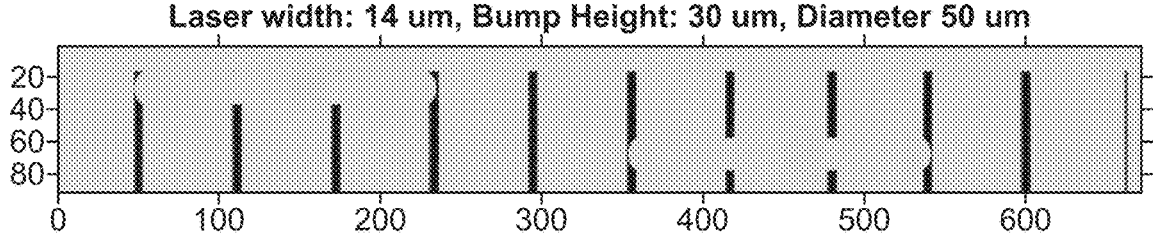
Figure 6C:
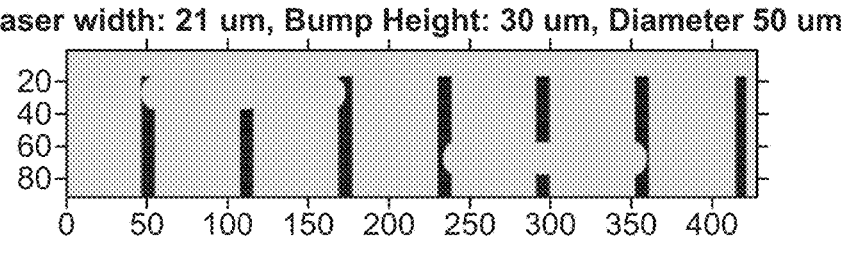

Un-binarized gray-scale plots of the images of the reflections received by the camera during the scan are shown in FIGS. 6A-6C.

For the 7-micron laser line width, the plots in FIG. 6A show shadows of the solder bump 660 starting to appear at position zero on the horizontal axis and disappearing beyond position 400, while the plots show shadows of the solder bump 662 appearing past position 600 and disappearing beyond position 1000. The solder bump 662 was lower than the solder bump 660, indicating the differing respective locations of the solder bumps on the surface under test. There are total of 22 images (90×60) collected to scan through the bump area.

For the 14-micron laser line width, the plots in FIG. 6B show shadows of the solder bump 660 starting to appear at position zero on the horizontal axis and disappearing between positions 200 and 300. The plots show shadows of the solder bump 662 appearing past position 300 and disappearing between position 500 and 600. Again, the solder bump 662 was lower than the solder bump 660, indicating the differing respective locations of the solder bumps. There are only 11 images (90×60) collected to cover the entire scan of 150 μm. For the same camera frame rate, the time to obtain the scan is cut to half compared to the 7 μm case.

For the 21-micron laser line width, the plots in FIG. 6C show shadows of the solder bump 660 starting to appear at position 50 on the horizontal axis and disappearing between positions 100 and 150. The plots show shadows of the solder bump 662 appearing past position 250 and disappearing before position 350. Again, the solder bump 662 was lower than the solder bump 660, indicating the differing respective locations of the solder bumps. There are only 7 images (90×60) collected to cover the entire scan of 150 μm. For the same camera frame rate, the time to obtain the scan is cut to one third compared to the 7 μm case.

The results of these scans indicate that increasing the laser line width can provide a significant amount of reduction in number of images collected to cover the same physical space therefore a faster inspection speed compared to very narrow laser line.

These results further indicate that the number of frames that extends from the onset of the shadow to disappearing of the shadow is inversely proportional to that of the laser linewidth.

The techniques shown and described herein can be performed using a portion or an entirety of a machine 700 as discussed below in relation to FIG. 7.

Figure 7:
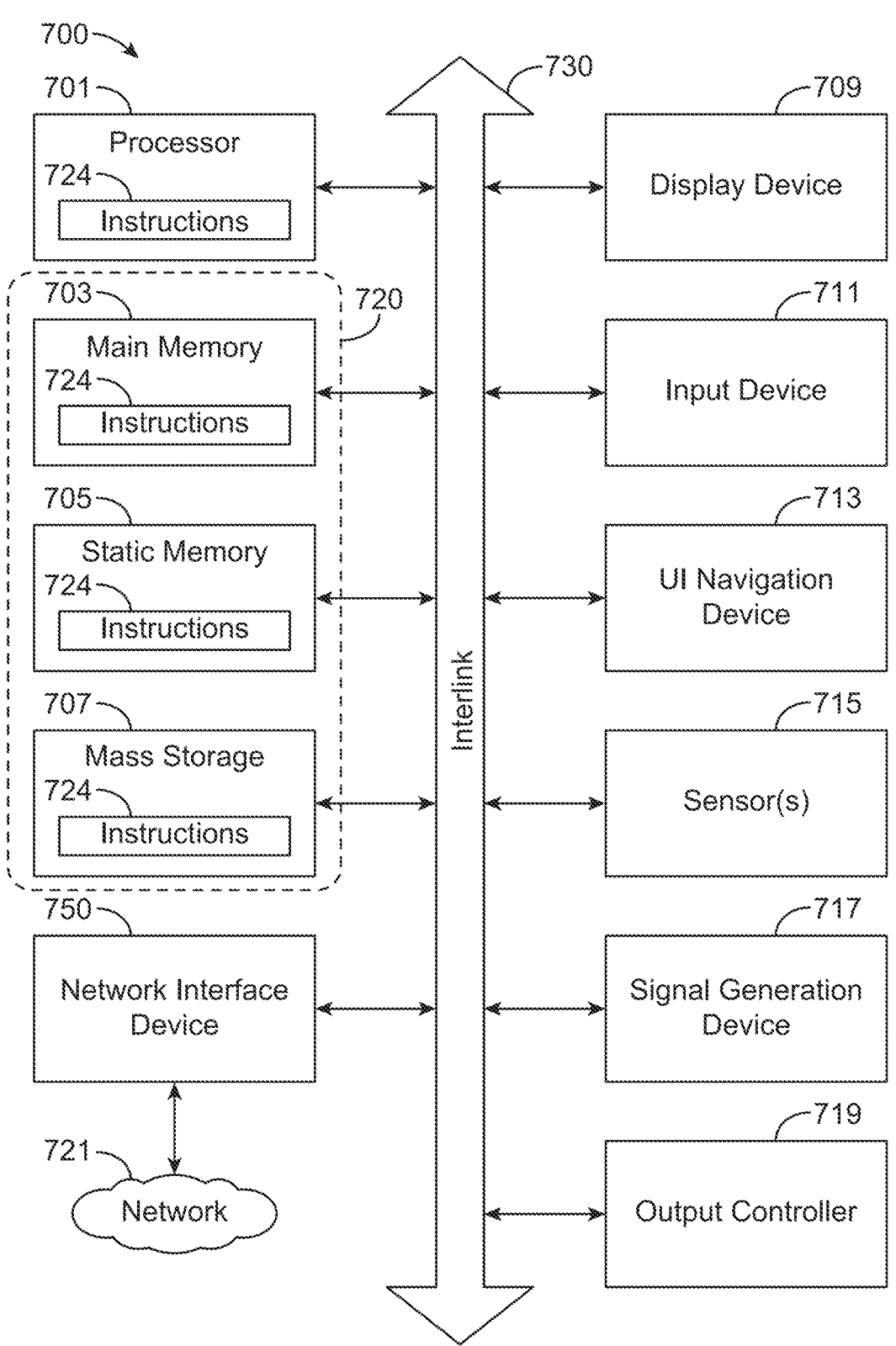
FIG. 7 is a block diagram of an example including a machine upon which any one or more of the techniques (e.g., methodologies) discussed herein may be performed.

FIG. 7 shows an exemplary block diagram comprising a machine 700 upon which any one or more of the techniques (e.g., methodologies) discussed herein may be performed. In various examples, the machine 700 may operate as a standalone device or may be connected (e.g., networked) to other machines.

In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), GPU and FPGA, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 700 (e.g., computer system) may include a hardware-based processor 701 (e.g., a central processing unit (CPU), a graphics processing unit (GPU), a hardware processor core, or any combination thereof), a main memory 703 and a static memory 705, some or all of which may communicate with each other via an interlink 730 (e.g., a bus). The machine 700 may further include a display device 709, an input device 711 (e.g., an alphanumeric keyboard), and a user interface (UI) navigation device 713 (e.g., a mouse). In an example, the display device 709, the input device 711, and the UI navigation device 713 may comprise at least portions of a touch screen display. The machine 700 may additionally include a storage device 720 (e.g., a drive unit), a signal generation device 717 (e.g., a speaker), a network interface device 750, and one or more sensors 715, such as a global positioning system (GPS) sensor, compass, accelerometer, or other sensor. The machine 700 may include an output controller 719, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 720 may include a machine-readable medium on which is stored one or more sets of data structures or instructions 724 (e.g., software or firmware) embodying or utilized by any one or more of the techniques or functions described herein. The instructions 724 may also reside, completely or at least partially, within a main memory 703, within a static memory 705, within a mass storage device 707, or within the hardware-based processor 701 during execution thereof by the machine 700. In an example, one or any combination of the hardware-based processor 701, the main memory 703, the static memory 705, or the storage device 70 may constitute machine readable media.

While the machine-readable medium is considered as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 721 using a transmission medium via the network interface device 750 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known under the trade designation Wi-Fi, the IEEE 802.26 family of standards known under the trade designation WiMax), the IEEE 802.27.4 family of standards, peer-to-peer (P2P) networks, among others. In an example, the network interface device 750 may include one or more physical jacks (e.g., Ethernet, coaxial, or phone jacks) or one or more antennas to connect to the communications network 721. In an example, the network interface device 750 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

The detailed description above refers to the accompanying drawings that show, by way of illustration, various embodiments that can be implemented. These embodiments are described in sufficient detail to enable those of ordinary skill in the art to practice these and other embodiments. Other embodiments may be utilized, and structural, logical, mechanical, and electrical changes may be made to these embodiments.

The following description provides specific details, such as material types, material thicknesses, and process conditions to provide a thorough description of embodiments described herein. However, a person of ordinary skill in the art will understand that the embodiments disclosed herein may be practiced without employing these specific details, and the embodiments may be practiced in conjunction with conventional fabrication techniques employed in the semiconductor industry. In addition, the description provided herein does not form a complete description of a semiconductor device or a complete process flow for manufacturing the semiconductor device and the structures described below do not form a complete semiconductor device. Only those process acts and structures necessary to understand the embodiments described herein are described in detail below. Additional acts to form a complete semiconductor device may be performed by conventional techniques.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the term "configured" refers to a size, shape, material composition, and arrangement of one or more of at least one structure and at least one apparatus facilitating operation of one or more of the structure and the apparatus in a pre-determined way.

As used herein, the term "semiconductor device" or "integrated circuit device" includes without limitation a memory device, as well as other semiconductor devices which may or may not incorporate memory, such as a logic device, a processor device, or a radiofrequency (RF) device. Further, a semiconductor device may incorporate memory in addition to other functions such as, for example, a so-called "system on a chip" (SoC) including a processor and memory, or a semiconductor device including logic and memory.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 97.0% met, at least 99.0% met, or even at least 99.9% met.

As used herein, the term "substrate" means and includes a base material or construction upon which additional materials are formed. The substrate may be a semiconductor substrate, a base semiconductor layer on a supporting structure, a metal electrode, or a semiconductor substrate having one or more materials, layers, structures, or regions formed thereon. The materials on the semiconductor substrate may include, but are not limited to, semiconductive materials, insulating materials, conductive materials, etc. The substrate may be a conventional silicon substrate or other bulk substrate comprising a layer of semiconductive material. As used herein, the term "bulk substrate" means and includes not only silicon wafers, but also silicon-on-insulator ("SOI") substrates, such as silicon-on-sapphire ("SOS") substrates and silicon-on-glass ("SOG") substrates, epitaxial layers of silicon on a base semiconductor foundation, and other semiconductor or optoelectronic materials, such as silicon-germanium, germanium, gallium arsenide, gallium nitride, and indium phosphide. The substrate may be doped or undoped.

As used herein, the terms "vertical," "longitudinal," "horizontal," and "lateral" are in reference to a major plane of a structure and are not necessarily defined by Earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure.

The materials described herein may be formed by conventional techniques including, but not limited to, spin coating, blanket coating, chemical vapor deposition (CVD), atomic layer deposition (ALD), plasma enhanced ALD, or physical vapor deposition (PVD). Alternatively, the materials may be grown in situ. Depending on the specific material to be formed, the technique for depositing or growing the material may be selected by a person of ordinary skill in the art. The removal of materials may be accomplished by any suitable technique including, but not limited to, etching, abrasive planarization (e.g., chemical-mechanical planarization), or other known methods unless the context indicates otherwise.

As used herein, the term "or" may be construed in an inclusive or exclusive sense. Further, other embodiments will be understood by a person of ordinary skill in the art based upon reading and understanding the disclosure provided. Moreover, the person of ordinary skill in the art will readily understand that various combinations of the techniques and examples provided herein may all be applied in various combinations.

Throughout this specification, plural instances may implement components, operations, or structures described as a single instance. Although individual operations are illustrated and described as separate operations, one or more of the individual operations may be performed concurrently, and, unless otherwise stated, nothing requires that the operations necessarily be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Further, although not shown explicitly but understandable to a skilled artisan, each of the various arrangements, quantities, and number of elements may be varied (e.g., the number of cameras). Moreover, each of the examples shown and described herein is merely representative of one possible configuration and should not be taken as limiting the scope of the disclosure.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of operations, systems, and processes have been described, these methods, operations, systems, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The description provided herein includes illustrative examples, devices, and apparatuses that embody various aspects of the matter described in this document. In the description, for purposes of explanation, numerous specific details are set forth in order to provide an understanding of various embodiments of the matter discussed. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments. As used herein, the terms "about," "approximately," and "substantially" may refer to values that are, for example, within +10% of a given value or range of values.

What is claimed is:

1. An apparatus to measure a characteristic of a surface feature on a substrate with improved speed, comprising:
   a light source to emit an interrogating beam onto a surface of the substrate comprising at least one surface feature, wherein the interrogating beam has a beam width selected to be equal to or greater than a measurable dimension of the at least one surface feature, wherein the interrogating beam is configured to simultaneously interact with a plurality of spatially distinct portions of the at least one surface feature at each of a plurality of sample positions to form a plurality of reflections, each reflection being derived from a different spatial portion of the interrogating beam;

a sensor to capture the plurality of reflections at each of the plurality of sample positions to generate a corresponding captured image for each sample position; and one or more processors configured to analyze the captured images from the plurality of sample positions to determine a measurable characteristic of the at least one surface feature.

2. The apparatus of claim 1, wherein the measurable characteristic of the at least one surface feature comprises a height of the at least one surface feature with respect to a plane of the surface.

3. The apparatus of claim 1, wherein the measurable characteristic of the at least one surface feature comprises a shape of an exposed surface on a top of the at least one surface feature.

4. The apparatus of claim 1, wherein a first captured image is derived from a first set of reflections corresponding to an onset of a shadow of a leading edge of the surface feature and a second captured image is derived from a second set of reflections corresponding to a disappearance of a shadow of a trailing edge of the surface feature, and the one or more processors are configured to determine a height of the surface feature with respect to a plane of the surface based on the first captured image and the second captured image.

5. The apparatus of claim 1, wherein a plurality of captured images are derived from reflections of the interrogating beam from an exposed surface on a top of the at least one surface feature, and the one or more processors are configured to determine a shape of the exposed surface based on the plurality of captured images.

6. The apparatus of claim 1, wherein the light source comprises a plurality of lasers, and wherein the plurality of lasers include continuous wave (CW) lasers, pulsed lasers, or combinations thereof.

7. The apparatus of claim 1, wherein the interrogating beam is a first interrogating beam having a first color or spot size, wherein the light source is configured to emit a second interrogating beam with a second color or spot size.

8. The apparatus of claim 1, wherein the sensor includes a plurality of cameras.

9. The apparatus of claim 1, wherein the one or more processors is a component of the sensor.

10. The apparatus of claim 1, wherein the one or more processors is remote from the sensor.

11. The apparatus of claim 1, wherein the one or more processors is configured to apply image pattern analysis to determine the measurable characteristic of the at least one surface feature.

12. A method for determining a characteristic of a surface feature on a surface of a substrate, the method comprising:

shining the surface with at least one light source, wherein the at least one light source emits an interrogating beam with a beam width selected to be equal to or greater than a measurable dimension of the surface feature that simultaneously interacts with a plurality of spatially distinct portions of the surface feature at each of a plurality of sample positions to form a plurality of reflections, wherein each reflection is derived from a different spatial portion of the interrogating beam;

capturing the plurality of reflections to generate a plurality of captured images, wherein each captured image is derived from a unique sample position relative to the interrogating beam; and processing at least a portion of the plurality of captured images to determine a measurable characteristic of the surface feature.

13. The method of claim 12, wherein the capturing comprises generating a first image comprising an onset of a shadow of a leading edge of the surface feature and a second image comprising a disappearance of a shadow of a trailing edge of the surface feature.

14. The method of claim 12, wherein the processing comprises determining a height of the surface feature with respect to a plane of the surface based on a first captured image of a first set of reflections and a second captured image of a second set of reflections.

15. The method of claim 12, wherein the measurable characteristic comprises a shape of an exposed surface on a top of the surface feature.

16. The method of claim 12, wherein the interrogating beam is a first interrogating beam having a first color or spot size, and wherein the at least one light source is configured to emit a second interrogating beam with a second color or spot size.

17. A non-transitory computer-readable medium containing instructions that, when executed by one or more processors of a machine, cause the machine to perform operations comprising:

moving at least one light source with respect to a surface of a substrate, wherein the at least one light source emits an interrogating beam with a beam width selected to be equal to or greater than a measurable dimension of a surface feature that simultaneously interacts with a plurality of spatially distinct portions of the surface feature on the surface to form a plurality of reflections, and wherein each reflection is derived from a different spatial portion of the interrogating beam;

capturing the plurality of reflections to generate a plurality of captured images, wherein each captured image is derived from a unique sample position relative to the interrogating beam; and processing at least a portion of the plurality of captured images to determine a measurable characteristic of the surface feature.

18. The non-transitory computer-readable medium of claim 17, wherein the capturing comprises generating a first image comprising an onset of a shadow of a leading edge of the surface feature and a second image comprising a disappearance of a shadow of a trailing edge of the surface feature.

19. The non-transitory computer-readable medium of claim 17, wherein the processing comprises determining a height of the surface feature with respect to a plane of the surface based on a first captured image of a first set of reflections and a second captured image of a second set of reflections.

20. The non-transitory computer-readable medium of claim 17, wherein the measurable characteristic comprises a shape of an exposed surface on a top of the surface feature.

* * * * *